United States Patent [19]

Borkat et al.

[11] 4,255,653

[45] Mar. 10, 1981

[54] OVERLAY DATA ENTRY DEVICE FOR AUTOMATED DATA SYSTEMS

[75] Inventors: Franklin R. Borkat, La Mesa; Richard W. Kataoka, San Diego, both of Calif.

[73] Assignee: The United States of America as represented by the Secretary of the Navy, Washington, D.C.

[21] Appl. No.: 115,631

[22] Filed: Jan. 28, 1980

[51] Int. Cl.³ ...................... G06K 21/06; G09B 23/28; G06K 19/00

[52] U.S. Cl. .................................. 235/495; 434/107; 235/487

[58] Field of Search ...................... 235/495, 487, 488; 35/17; 340/146, 3 Z

[56] References Cited

U.S. PATENT DOCUMENTS

| | | | |
|---|---|---|---|
| 1,526,717 | 2/1925 | Nunez | 35/17 |
| 1,988,634 | 1/1935 | Stonecypher | 35/17 |
| 3,171,021 | 2/1965 | Jonker | 235/487 |
| 3,186,111 | 6/1965 | Lawlor | 35/17 |
| 3,470,357 | 9/1969 | Ritzerfeld et al. | 235/494 |
| 3,719,801 | 3/1973 | Drexler | 235/487 |
| 3,806,708 | 4/1974 | Waly | 235/495 |
| 3,859,632 | 1/1975 | Etter | 235/495 |
| 3,860,795 | 1/1975 | Morrill | 235/495 |
| 3,918,029 | 11/1975 | Lemelson | 235/495 |
| 3,979,839 | 9/1976 | Blanie | 235/487 |

Primary Examiner—Daryl W. Cook

Attorney, Agent, or Firm—Richard S. Sciascia; Ervin F. Johnston; Thomas Glenn Keough

[57] ABSTRACT

A device for entering data into an automated data processing system. The data for entry into the system is prepared and selected on multiple checklists where each checklist has the same format but different specific data entries. On each checklist there is also a unique black-in area. The data entry terminal or device includes a transparent overlay for entry of the data into the system. The transparent overlay aligns with and is placed over the checklist from which the data to be entered is to be selected. The transparent overlay contains a first set of code numbers corresponding to each data entry and a second set of code numbers apart from the data entries. Due to the arrangement of the black-in area on each checklist, only one member of the second set of code numbers on the transparent overlay is readable or codeable since the remaining members of the second set of code numbers are obscured by the black-in area on the checklist beneath the transparent overlay. This readable number is used as an identifier or a prefix for all checked or selected entries on the checklist. The members of the first set of code numbers corresponding to each data entry are the same for each data entry that is similarly situated on each checklist but are rendered uniquely identifiable by the inclusion of the identifier or prefix code number that is made unique to each checklist by the black-in area on the checklist.

12 Claims, 7 Drawing Figures

| URINALYSIS | | HEMATOLOGY II | | BONE MARROW—$20d_1$ |
|---|---|---|---|---|
| ROUTINE—$16d_1$ | | LE PREP—$18d_1$ | | PLATELET AGGREGATION—$20d_2$ |
| MICROSCOPIC—$16d_2$ | 16b | G6PD—$18d_2$ | 18b | PROTHROMBIN CONSUMPTION—$20d_3$   $20b$ |
| | | OSMOTIC FRAGILITY—$18d_3$ | | PROTAMINE GELATION—$20d_4$ |
| CHEMISTRY I | | HAMS PNH TEST—$18d_4$ | | FACTOR II—$20d_5$ |
| SMA 6/60—$16d_3$ | | HEINZ BODIES—$18d_5$ | | FACTOR V—$20d_6$ |
| SMA 12/60—$16d_4$ | | LEUK. ALK. PHOSPHATASE—$18d_6$ | | FACTOR VII—$20d_7$ |
| | | NASAL SMEAR—$18d_7$ | | FACTOR VIII—$20d_8$ |
| HEMATOLOGY I | | SUGAR H²O—$18d_8$ | | FACTOR IX—$20d_9$ |
| CBC—$16d_5$ | | CELL COUNT FLUID SPECIFY—$18d_9$ | | FACTOR X—$20d_{10}$   $20a$ |
| DIFFERENTIAL—$16d_6$ | | PT—$18d_{10}$ | 18b | FACTOR XI—$20d_{11}$   $20b$ |
| HGB & HCT—$16d_7$ | 18a | PTT—$18d_{11}$ | 18a | FACTOR XII—$20d_{12}$ |
| 16a | 16b | BLEEDING TIME—$18d_{12}$ | | FACTOR XIII—$20d_{13}$ |
| | | FIBRINOGEN—$18d_{13}$ | | FIBRIN SPLIT PRODUCTS—$20d_{14}$ |
| | | CLOT RETRACTION—$18d_{14}$ | | EUGLOBULIN—$20d_{15}$ |
| | | | 20a | |

Physician: ..............
Code:       ..............
Date:       ..............

FIG.1

— DATA CHECK LIST ENTRY
▷ CODE FOR AUTOMATED READ

| BLOOD CHEMISTRY | URINE CHEMISTRY | HEMATOLOGY | CEREBROSPINAL FLUID |
|---|---|---|---|
| ACETONE—72 | ACETONE | DIFFERENTIAL | CELL COUNT |
| ALBUMIN | AMYLASE | HGB | CHLORIDE |
| ALCOHOL | BARBITURATES | HCT | GLUCOSE |
| AMYLASE | CHLORIDE | ☒ WBC | PROTEIN |
| BARBITURATES | ☒ OSMOLALITY | SICKLE CELL ID | —74 |
| BILIRUBIN, TOTAL | PHENOTHIAZINE SCREEN | ESR | URINALYSIS |
| BILIRUBIN, DIRECT | POTASSIUM | PT | ROUTINE |
| BUN | SODIUM | PTT—72 | MICROSCOPIC–72 |
| ☒ CALCIUM—72 | | FIBRINOGEN | |
| CHLORIDE | | PLATELET COUNT | OTHER |
| CO2 | —74 | —74 | |
| GLUCOSE | | | |
| OSMOLALITY | | | |
| SALICYLATES | | | |
| SODIUM POTASSIUM | | | |
| TOTAL PROTEIN | | | |

74

Physician: . . . . . . . . . . .
Code: . . . . . . . . . . .
Date: . . . . . . . . . . .

*FIG.5*

OVERLAY DATA ENTRY DEVICE FOR AUTOMATED DATA SYSTEMS

BACKGROUND OF THE INVENTION

The present invention relates generally to automated data systems and more specifically to automated data systems in which data entries into the system are made from checklists or menus of data entries. Clinical laboratories have made use of such automated data systems. One such automated data system is the clinical laboratory at the National Naval Medical Center in Bethesda, Md. This system accepts requests for laboratory tests, performs certain tests and reports the results. A typical system scenario is as follows. A patient's identification and associated requests for laboratory tests are entered into the system computer. This is done by producing an identification card with a machine readable code that is unique to a patient and by accurately reading that code into the system computer at a laboratory request terminal. After reading in the patient code, a series of tests is entered into the computer file followed by a physician code for validation. These data are stored until the specimen arrives at the laboratory at which time entering the patient identification code directs a system component to type specimen labels for requested laboratory tests for that ID code.

In the National Naval Medical Center system there are approximately 400 test procedures that are routinely performed on specimens. In order to select which procedure is to be performed on any particular specimen, the system uses a number of mark sense checklist type of forms. These forms are printed on standard Hollerith cards and are entered into the system by placing the card in a mark sense reader. To accommodate the 400 tests that are performed, the tests are distributed over and called out over eleven separate cards. Because of the precision required by the mark sense reader, the cards are printed with careful quality control so that textual identification and pre-printed registration marks align for mark sense reading. As a result of the double printing and the quality control necessary for precision, the cards are very expensive. In addition, the writing on the card is small and is difficult to read. Further, the cards are frequently roughly handled. They are often tied to specimens or are carried in a folded condition. Because of this treatment, the cards are often unreadable by the mark sense reader. When this happens, the data must be manually transcribed into the automated clinical laboratory system. This task is time consuming and provides the potential for transcription error.

SUMMARY OF THE INVENTION

In accordance with the present invention there is disclosed herein a system for selecting and identifying data entries from lists of data entries and for providing a system whereby the selected data entries may be entered into a system computer. More particularly, the present invention is intended to serve as a system for selecting and identifying test procedures to be performed on hospital specimens at an automated clinical laboratory such as the one at the National Naval Medical Center in Bethesda, Md.

The system disclosed herein for laboratory test request entry uses paper for the primary selection of the tests. In this system the requester circles the name of the laboratory test to be performed or places a mark beside it on a formatted, preferably 8½"×11", sheet of test names. When this sheet arrives at the laboratory request terminal it is placed under a transparent overlay which contains carefully printed bar codes or other machine readable coding. Alignment is made so that the test request names are matched to their appropriate bar codes. For test request entry of the specific test items into the system computer, the bar code from the overlay is read with an appropriate device such as a reader wand. The single transparent overlay located at the laboratory request terminal has a number of bar codes preferably at either the top or bottom which do not align with the test names. There are a set comprised of, for example, four such bar codes on the transparent overlay. Each test request form has a unique solid black area that lies under all but one of these bar codes when the request sheet is in place under the overlay. This unique solid black area obscures all but one of the members of the set of the bar codes and as a result only one bar code is readable. In operation, the reader wand is first passed over the one readable bar code which is not blocked out by the underlying black-in area. The number thus identified preferably becomes a prefix which is used to uniquely code all the other bar codes of the transparent overlay. With this single overlay and multiple forms all tests can be reliably and quickly entered.

The test request forms are used once and retained in the patient's jacket and saved as long as record keeping is required. The quality control of these forms is not critical; xerographic copies provide sufficient quality, and as a result, printing costs of the paper are low. The transparent overlays, however, must be of good quality. Since there are so many laboratory tests for selection, many request forms previously had to be used. A full sheet of paper that is used with the bar code overlay of the present invention permits more names on a single sheet and thereby reduces the number of laboratory request forms required although multiple forms are still required. Multiple transparent overlays, however, are eliminated by using the black-in area on each request form.

The bar code overlay scheme disclosed herein can be used as a completely on-line system with laboratory request terminals distributed throughout the hospital or other system and the orders can be placed from any of these terminals. The fact that inexpensive request forms may be used provides for a substantial cost savings. The paper request forms can act as a backup to the ordering procedure in the event that there is a terminal malfunction.

OBJECTS OF THE INVENTION

Accordingly, it is the primary object of the present invention to disclose a data entry system that may use standard size paper, that minimizes system costs and that provides more space for entries, thus reducing the number of forms and permitting larger characters for legibility.

It is another object of the present invention to disclose a data entry system in which precise control is not required in printing forms so that inexpensive, one-step printing or even electrostatic copying may be used.

It is another object of the present invention to disclose a data entry system in which the manner of handling forms is not important since folded or crumpled paper can be partially flattened and placed under the overlay for a successful data entry.

Other objects, advantages and novel features of the invention will become apparent from the following detailed description of the invention when considered in conjunction with the accompanying drawings.

BRIEF DESCRIPTION OF THE DRAWINGS

FIG. 1 is a diagram of an exemplary data entry selection form illustrating a unique blackened coding area.

FIG. 5 is an alternative embodiment of a data entry selection form.

DESCRIPTION OF THE PREFERRED EMBODIMENT

Figures 2, 3:
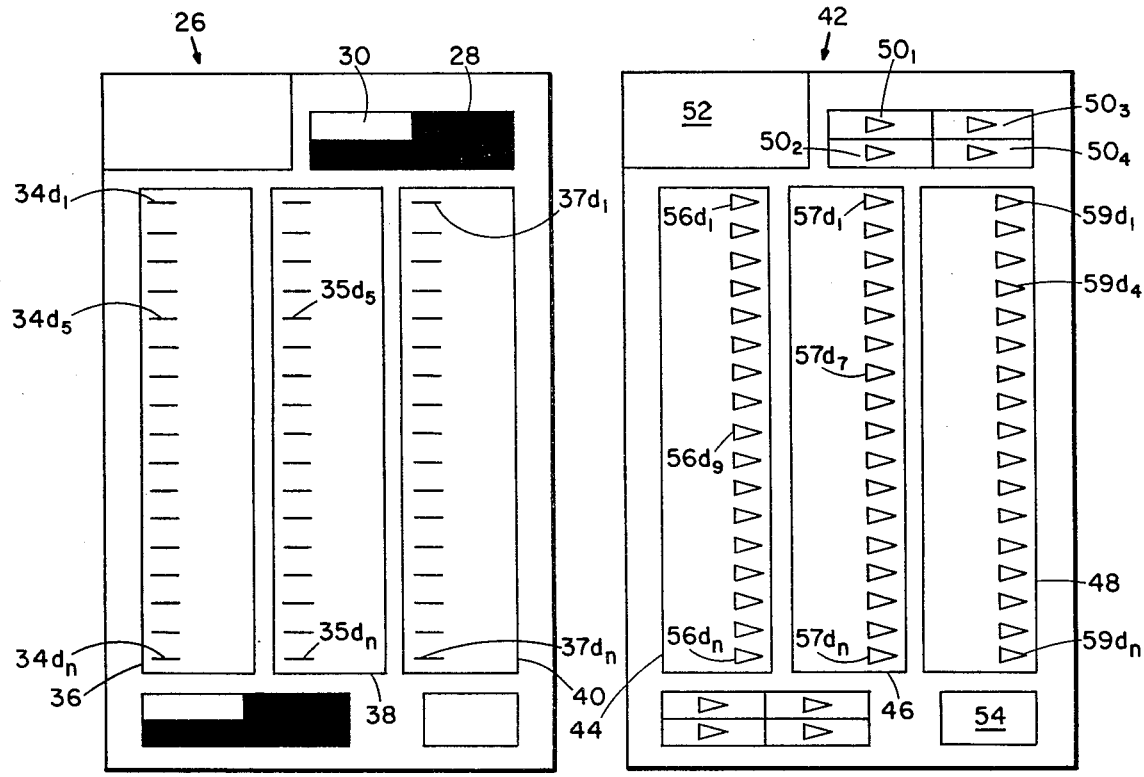
FIG. 2 is a schematic representation of a second embodiment of a data entry selection form illustrating a second unique blackened coding area.
FIG. 3 is a schematic representation of a transparent overlay in accordance with the present invention.

The overlay data entry system of the present invention typically uses multiple data entry request forms. One such data entry request form is illustrated in FIG. 1. As seen in FIG. 1 request form 12 is a request form in accordance with the present invention that relates to a hospital laboratory test request set. It is to be understood, however, that the present invention is not limited to hospital or laboratory applications but could be used in any environment wherein one or more members of a set of data items must be selected from the set of data items. Each form 12 can be printed on standard size paper with common printing techniques or by conventional electrostatic copying mechanisms. For the hospital application described herein each request form may be provided with an area 14 which may be imprinted by means of an embossed plastic patient identification card. Each data request form in the system has a similar organization in that the layout of the data entries is the same for all forms. In the exemplary form illustrated in FIG. 1 the data entries are arranged in three columns 16, 18 and 20 having column lines 16a, 18a and 20a, respectively, and row lines 16b, 18b and 20b, respectively. Human readable information appears on the data request form 12 and is inserted in the blocks defined by the format columns 16a, 18a and 20a and the format row lines 16b, 18b and 20b, respectively. As examples there are laboratory test data items written in English language in each of the three columns on the request form 12. The data items in column 16 are denoted as data item $16d_1$ through data item $16d_7$. Data items $18d_1$ through $18d_{14}$ and $20d_1$ through $20d_{15}$ appear in columns 18 and 20, respectively.

In one specified area of every data request form, for instance the upper right hand corner in the present example, there is a space provided for a black-in area. Thus, in the upper right hand corner of FIG. 1 there is illustrated a black-in area 22. The black-in area 22 is unique to each different data request form in the system. The black-in area 22 may also be replicated in another area of the data request form 12 such as the one illustrated in the lower left corner of FIG. 1 and indicated as black-in area 24. Referring briefly to FIG. 2 there is illustrated in schematic form a data request entry sheet 26 similar in format to the request form 12 of FIG. 1 but with the exception that the black-in area on sheet 26 is blackened in a different selected portion thereof. As is seen in FIG. 2, the black-in area 28 is blackened in a rectangular section in all but the upper left hand corner 30 thereof, whereas the black-in area 22 of the data entry request form illustrated in FIG. 1 is blackened in in all areas except for the upper right hand corner 32 thereof. It is noted that the specific data items $34d_n$, $35d_n$ and $37d_n$ appearing in the three columns 36, 38 and 40 are pictorially represented as straight lines for the purpose of simplicity. It is to be understood, however, that each of the data items 34 represents a distinct, unique data entry which can be different from each other and different from each data entry on the data request sheet 12 illustrated in FIG. 1. Thus, comparing FIG. 1 and FIG. 2 it is noted that aside from the difference in the specific data item entries, the forms are different in that the black-in area 22 on the request form illustrated in FIG. 1 is left white in the upper right hand corner 32 thereof and the black-in area 28 on the request form illustrated in FIG. 2 is left white in the upper left hand corner 30 thereof. In use, the person who wishes to transfer information to the system computer selects an appropriate form and then circles or by other marking, identifies the human readable information he has selected, identified as data item 16d, 18d and 20d in FIG. 1 and as data entries 34 in FIG. 2. In a typical scenario this data request form is then sent to a reading station. At the reading station the form is placed under a transparent overlay to be described below.

Figure 7:
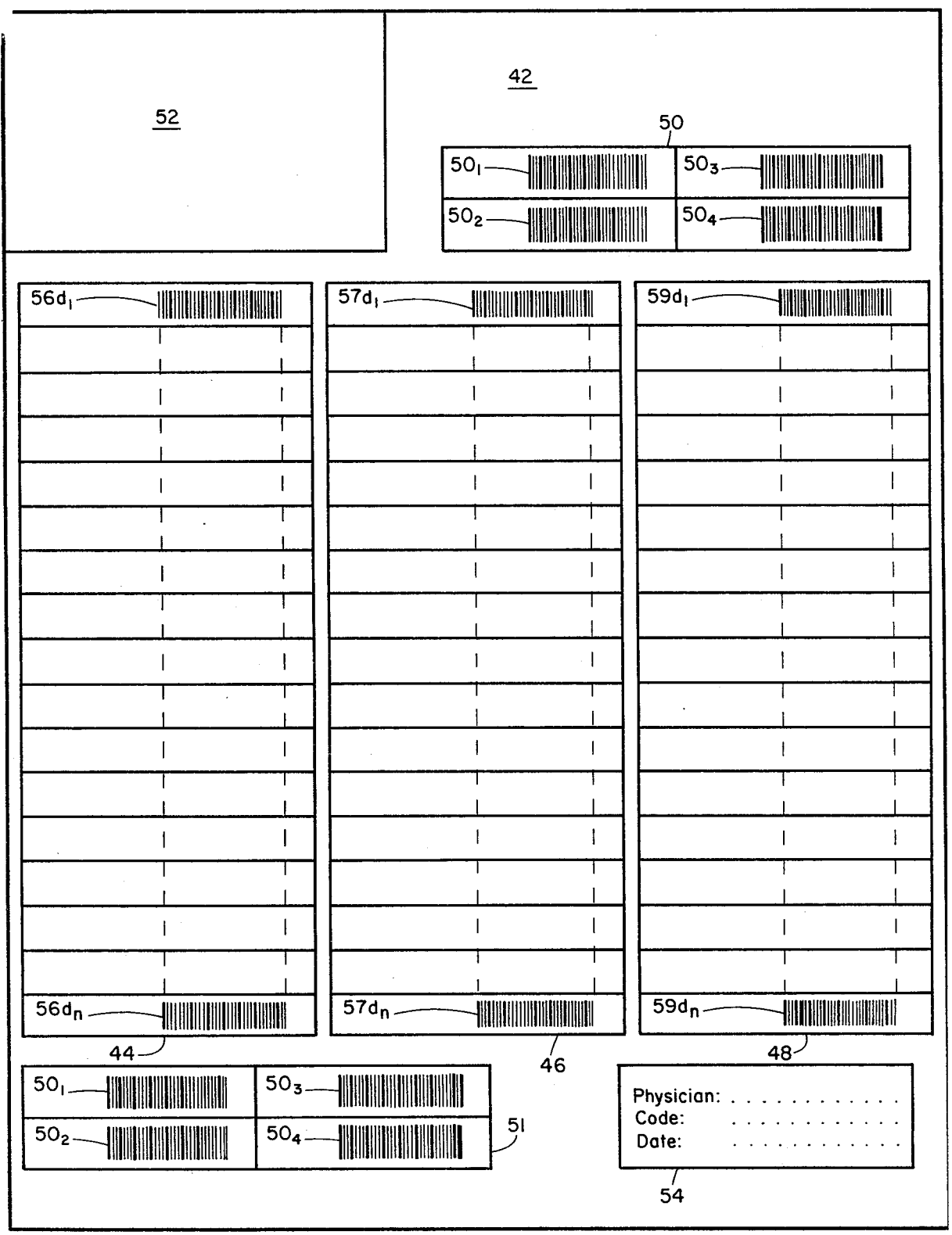
FIG. 7 is a diagram of the transparent overlay suitable for use with the data request entry form of FIG. 1.

Referring to FIG. 7 there is illustrated an example of a transparent overlay. It is seen that the overlay has an identical format to the format of data entry request forms 12 and 26 illustrated in FIGS. 1 and 2, respectively, i.e. the overlay 42 illustrated in FIG. 7 is arranged with three columns 44, 46 and 48 and also has a code area 50 containing a set of codes $50_1$, $50_2$, $50_3$ and $50_4$. The size and location of the area 50 is precisely the same size and in preciseley the same location as the black-in areas 22 and 28 illustrated in FIGS. 1 and 2, respectively, The transparent overlay also has an area 52 corresponding to the patient identification area 14 in FIG. 1 and entry area 54 corresponding to the data entry block 56 illustrated in FIG. 1 for notation of additional information such as a physician name, code and date. Although in the present example there are illustrated three columns of data entries in each of the aforementioned request forms 12 and 26 and also the transparent overlay 42, it is to be understood that any suitable number of columns and/or rows of data entries may be used so long as the number of columns and rows are consistent throughout the request forms and overlay. The overlay 42 may be comprised of a Mylar sheet or any other transparent plastic material. The overlay 42 has machine or human readable numbers that when aligned properly lie beside every entry on the body of the request form such as the request form 12 and 26 illustrated in FIGS. 1 and 2, respectively. In the example illustrated in FIG. 7 the numbers are indicated as bar code numbers $56d_n$, $57d_n$ and $59d_n$ where n=17 in this example. It is noted that each of the bar code numbers $56d_n$, $57d_n$ and $59d_n$ is in fact a distinct, unique machine readable code but that for purposes of simplicity of illustration the actual bar codes have been drawn in only the first and last row of each column on the transparent overlay in FIG. 7. Additionally, as aforementioned there is a distinct bar code in each of the four locations in the code entry block 50. Thus, bar codes $50_1$, $50_2$, $50_3$ and $50_4$ are all distinct, unique bar codes.

Referring to FIG. 3 there is a schematic illustration of the transparent overlay of FIG. 7. For purposes of simplicity the bar codes $56d_n$, $57d_n$ and $59d_n$ and the bar codes $50_1$, $50_2$, $50_3$ and $50_4$ are illustrated as arrowheads.

Figure 4:
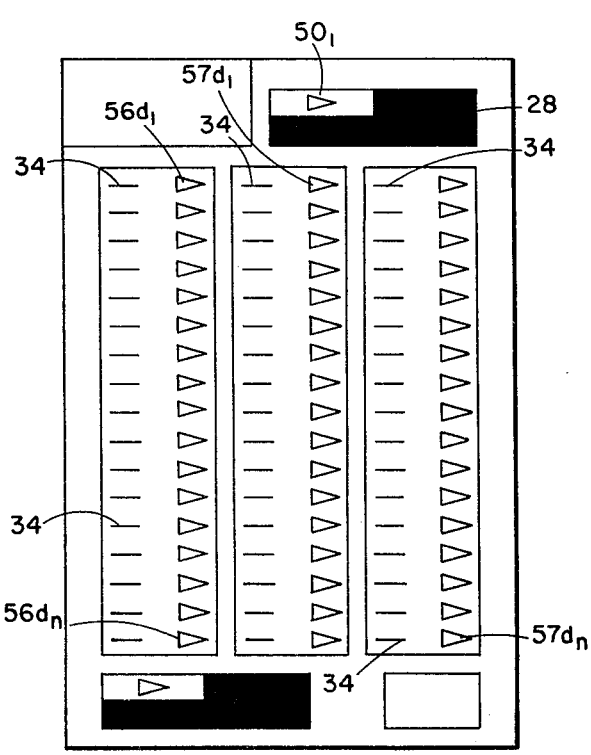
FIG. 4 is a schematic representation of a composite of the transparent overlay of FIG. 3 when placed over the data entry selection form illustrated in FIG. 2.

Referring to FIG. 4 there is illustrated the result when the overlay 42 illustrated in FIG. 3 is placed over the data request entry form 26 illustrated in FIG. 2. As is seen in FIGS. 2, 3 and 4, each black-in area such as the black-in area 28 of data request entry form 26 is designed so that only one overlay code is readable when the overlay is placed on top of the data request entry form. Thus, as is seen in FIG. 4 the black-in area 28 obscures the bar code entries $50_2$, $50_3$ and $50_4$, leaving readable only the bar code entry $50_1$. Prior to entry into the system computer, therefore, of the selected ones of the data items 34 which would be circled or otherwise marked to indicate selection thereof, the operator would read the viewable bar code, $50_1$ in the present example, with a reader wand and would then run the reader wand across the bar codes of each one of the selected data entries $34d_n$, $35d_n$ and $37d_n$. This unique bar code from the set of codes 50 is preferably used as a prefix with each of the distinct, unique bar codes associated with each data entry 34 in the body of the form. Each data entry for each distinct, unique data request form is thus identified by the unique prefix code given to it by the prior reading by the reader wand of the bar code in the area 50.

Figure 6:
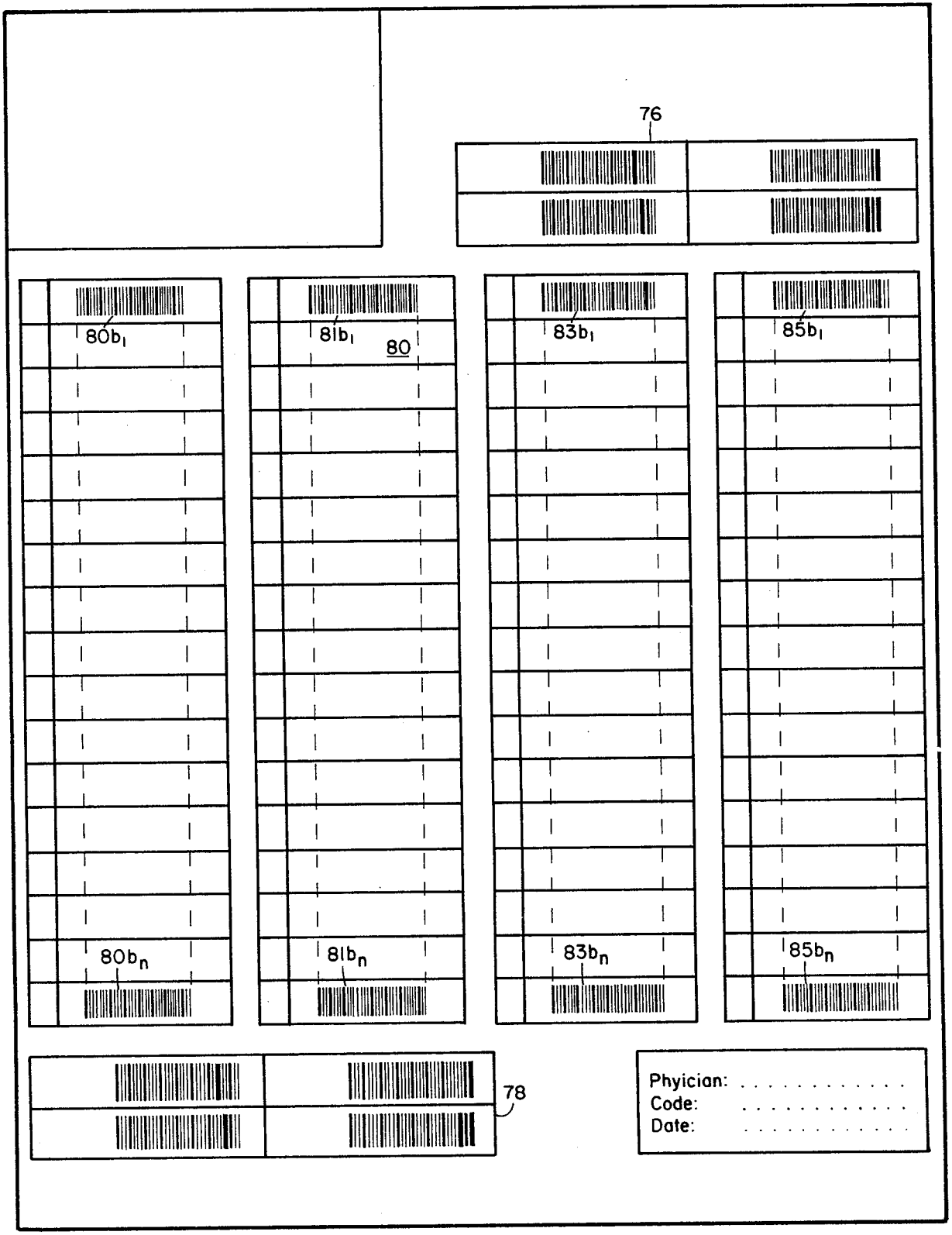
FIG. 6 is an alternative embodiment of a transparent overlay suitable for use with the data entry selection form of FIG. 5.

Referring now to FIGS. 5 and 6 there is illustrated an alternative format for the overlay data entry system of the present invention. It is to be understood, however that the present invention is not limited to the two data entry request formats shown and described herein but that any suitable format may be used so long as each distinct data entry request form has a unique black-in area associated therewith. The data entry request form 58 illustrated in FIG. 5 has an area 60 like area 14 in the form of FIG. 1 for the entry of patient identification information and an area 62 in the lower right hand corner thereof for entry of additional data such as physician name, code and date. Similarly, the data request entry form 58 has two black-in areas 64 and 66 with portions 68 and 70 thereof, respectively, which remain white. This data request entry form differs from the forms illustrated in FIGS. 1 and 2 in that there is more room for data entries due to the fact that the English descriptor data item entries illustrated generically as data items 72 are positioned such that they will be covered over by the bar codes of the associated overlay transparency illustrated in FIG. 6 described below. To accomodate this modification there is a box 74 adjacent to each English descriptor words 72 in which a human may enter an X or other mark to indicate that that particular English descriptor word has been selected. Referring to the overlay transparency illustrated in FIG. 6 it is seen that the format therein is precisely the same as the format of the data entry request form 58, i.e. there are a set of four bar codes in the four rectangular blocks formed in the areas 76 and 78, these bar codes within area 76 and 78 coinciding exactly with the areas 64 and 66 of the request form 58 illustrated in FIG. 5 when the transparent overlay of FIG. 6 is placed over the request form 58 of FIG. 5. Referring to FIG. 6 each of the bar codes $80b_n$, $81b_n$, $83b_n$ and $85b_n$ except for the bar code in the top row of each column is indicated in dotted lines for the purpose of simplicity. It is understood however, that each bar code is a distinct, unique number. The bar codes $80b_n$, $81b_n$, $83b_n$ and $85b_n$ in the embodiment illustrated in FIGS. 5 and 6 are backed by any suitable white backing (not shown) such as white ink, paint, or white paper. When the transparent overlay of FIG. 6 is placed over the data entry request form of FIG. 5 the white backing beneath each bar code $80b_n$, $81b_n$, $83b_n$ and $85b_n$ will obscure the English descriptor words 72 on the form 58 such that only the mark such as an X in the blocks 74 will be visible through the transparency. With this type of overlay system there is more space on each page for data entries, however the English descriptor words are not visible. As in the scheme described with respect to FIGS. 1 and 2, the prefix overlay areas 76 and 78 are transparent and the black-in areas 64 and 66 of the selection sheet render only the appropriate code readable.

Although the overlay data entry system of the present invention is described with respect to a bar code reading system, it is to be understood that it is within the scope of the present invention to incorporate other coding schemes. For instance instead of the bar code reading scheme the coding scheme could be of the optical character recognition type of which there are many examples. Alternatively, the coding scheme could be human readable digits for keyboard entry. Also it is to be understood that the present invention is not limited to the black-in area formats and locations illustrated in the drawing and described above and that the black-in area formats can be made to accommodate as many identifier or prefix code numbers as are desired and permitted by the space avaliable.

Obviously many modifications and variations of the present invention are possible in the light of the above teachings. It is therefore to be understood that within the scope of the appended claims the invention may be practiced otherwise than as specifically described.

What is claimed is:

1. An overlay data entry system for automated data systems comprising:

at least two sheets of material each having a distinct set of data entries thereon for selection therefrom by the addition of a marking adjacent to the selected data entries of said sets of data entries, each of said at least two sheets of material having identical means thereon for alignment of a transparent overlay therewith, each said sheet of material having a distinct blackened area thereon different from said blackened area on every other said sheet of material; and a transparent overlay having first means thereon for alignment with said alignment means, said transparent overlay further having a first set of indicia thereon forming a first set of numbers, said first set of indicia being so disposed that when said transparent overlay is aligned with one of said at least two sheets of material, each member of said first set of indicia lies adjacent to one member of said set of data entries, said transparent overlay further having a second set of indicia forming a second set of numbers disposed such that when said transparent overlay is aligned over one of said at least two sheets of material, said distinct blackened area obscures some of the members of said second set of indicia.

2. The overlay data entry system of claim 1 wherein each said set of data entries comprises human readable data.

3. The overlay data entry system of claim 1 wherein said first set of indicia comprises machine readable indicia.

4. The overlay data entry system of claim 3 wherein said second set of indicia comprises machine readable indicia.

5. The overlay data entry system of claim 4 wherein said first and second sets of indicia comprise black bar code indicia.

6. The overlay data entry system of claim 4 wherein said first and second sets of indicia comprise optical character recognition indicia.

7. An overlay data entry system for automated data systems comprising:
- at least two sheets of material each having a distinct set of data entries thereon for selection therefrom by the addition of a marking adjacent to the selected data entries of said sets of data entries, each of said at least two sheets of material having identical means thereon for alignment of a transparent overlay therewith, each said sheet of material having a distinct blackened area thereon different from said blackened area on every other said sheet of material; and
- a transparent overlay having first means thereon for alignment with said alignment means, said transparent overlay further having a first set of indicia thereon forming a first set of numbers, said first set of indicia being so disposed that when said transparent overlay is aligned with one of said at least two sheets of material, each member of said first set of indicia lies over one member of said set of data entries, said transparent overlay further comprising a substantially white backing disposed beneath each member of said first set of indicia so as to obscure each member of said set of data entries when said transparent overlay is aligned over one of said at least two sheets of material, said transparent overlay further having a second set of indicia forming a second set of members disposed such that when said transparent overlay is aligned over one of said at least two sheets of material, said distinct blackened area obscures some of the members of said second set of indicia.

8. The overlay data entry system of claim 7 wherein each said set of data entries comprises human readable data.

9. The overlay data entry system of claim 7 wherein said first set of indicia comprises machine readable indicia.

10. The overlay data entry of claim 9 wherein said second set of indicia comprises machine readable indicia.

11. The overlay data entry system of claim 10 wherein said first and second sets of indicia comprise black bar code indicia.

12. The overlay data entry system of claim 7 wherein said distinct blackened area obscures all but one of said members of said second set of indicia when said transparent overlay is aligned over one of said at least two sheets of material.

* * * * *